United States Patent

Alger et al.

[15] 3,643,117
[45] Feb. 15, 1972

[54] LINEAR RECIPROCATING ELECTRIC MOTORS

[72] Inventors: Philip Langdon Alger, Schenectady; Charles Wilson, Troy, both of N.Y.

[73] Assignee: Mechanical Technology Incorporated, Latham, N.Y.

[22] Filed: Sept. 3, 1970

[21] Appl. No.: 69,267

[52] U.S. Cl. .................................................310/17, 310/30
[51] Int. Cl. ..................................................H02k 33/00
[58] Field of Search ..................................310/12–14, 15, 310/27, 30, 23, 29, 39, 35, 17

[56] References Cited

UNITED STATES PATENTS

| | | | |
|---|---|---|---|
| 3,312,842 | 4/1967 | Heuchling et al. | 310/17 |
| 2,781,461 | 2/1957 | Booth et al. | 310/27 |
| 2,789,237 | 4/1957 | Efromson | 310/27 |
| 3,505,544 | 4/1970 | Helms | 310/13 |

*Primary Examiner*—D. F. Duggan
*Attorney*—Joseph V. Claeys and Charles W. Helzer

[57] ABSTRACT

A linear reciprocating electric motor of the type wherein a moving member is arranged to reciprocate within an opening in a stationary member which constitutes the electromagnetic circuit thereof, is provided with a pair of identical balancing coils arranged on the stationary member on opposite sides of the moving member and connected in series-bucking relationship so that the balancing coils are operative to maintain equality of fluxes on both sides of the moving member to prevent side pull thereon. Further equalizing effect is achieved by including an airgap region through the stationary member extending in a direction colinear with the axis of motion of the moving member.

11 Claims, 5 Drawing Figures

PHILIP L. ALGER
CHARLES WILSON
INVENTORS

BY *[signature]*
THEIR ATTORNEY

PHILIP L. ALGER
CHARLES WILSON
INVENTORS
BY *Joseph V. Claeys*
THEIR ATTORNEY

3,643,117

LINEAR RECIPROCATING ELECTRIC MOTORS

This invention relates generally to linear reciprocating electric motors sometimes referred to in the art as linear actuators. The function of these devices is to deliver reciprocating motion to a load, the load usually being a combination of elastic, inertial, and dissipative effects, as in driving, for example, a reciprocating pump or compressor employing a spring means having a resonant frequency equal to twice the line frequency when the supply is alternating current or line frequency when the supply is rectified alternating current. This invention relates more particularly to improvements in the mechanical and electrical design to increase the amplitude of the axial motion of the moving member without increasing the airgap and to balance the moving member against transverse forces to assure its linear movement.

Briefly stated, in accordance with one aspect of this invention, the above improvements are achieved by shaping the end of the moving member and the recess in the stationary member into which it moves so as to obtain a conical or tapered airgap and by providing balancing coils on the stationary member adjacent to the lateral sides of the moving member.

The novel features believed characteristic of this invention will best be understood from the following description taken in connection with the accompanying drawings in which.

Figure 1:
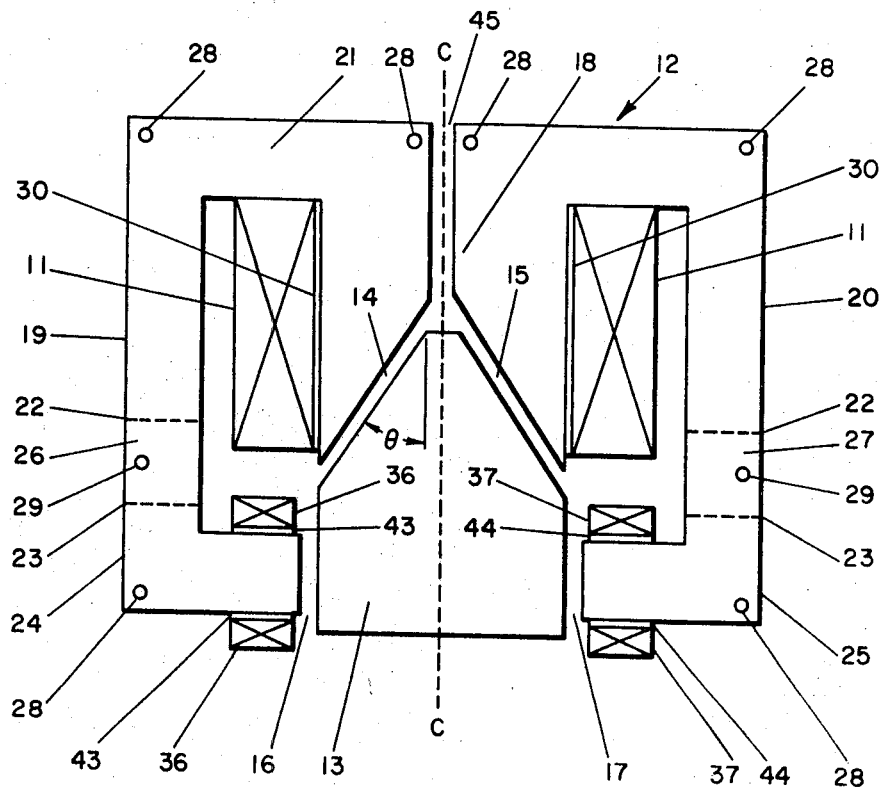
FIG. 1 is a schematic sectioned layout of the linear electric motor in accordance with one embodiment of the invention.

Referring to FIG. 1 the linear electric motor is shown schematically in vertical orientation as identified by the vertical disposition of its axial centerline C—C. The apparatus illustrated in FIG. 1 comprises a stationary member 12 which may be formed from a number of laminations to minimize the generation of eddy currents as is general practice. Member 12 may be of any suitable configuration and is preferably formed, as shown in FIG. 1, as a rectangle with an opening provided in one long side thereof and a central leg 18 extending from the other long side toward the opening and preferably terminating in a recess of generally trapezoidal cross section.

A moving member 13 is adapted to reciprocate within the opening in the stationary member and to this end a coil 11 is disposed on the central leg 18 to produce the required magnetomotive force. Moving member 13 terminates at one end in a trapezoidal cross section similar to that of the recess in leg 18 so as to form tapered working airgaps 14 and 15 with the tapered walls of the recess. The other end of the moving member 18 forms parasitic airgaps 16 and 17 with the terminations of the portions of the long side of the stationary member which define the opening.

Although not shown in the drawings, it will be appreciated that any load coupled to the moving member 13 will be moved up and down for the orientation shown in FIG. 1, it being understood that a suitable spring means is included in accordance with general practice for linear actuators of this type so as to permit the moving member 13 to oscillate at resonant frequency.

As shown in FIG. 1, coil 11 is positioned on center leg 18 of the E-shaped stationary member 12 and moving member 13 is located on the coil axis C—C. This arrangement minimizes the flux leakage, as the MMF of the coil is nearly all used up in the adjacent airgaps 14 and 15. Thus, the MMF across the height and width of the laminations is zero (except for the small MMF required to overcome the reluctance of the lamination steel), and there is no external leakage flux.

The magnetic flux passes down through the center leg 18, across the airgaps 14 and 15 to the moving member 13, and then divides into two equal parts which cross the parasitic gaps 16 and 17, and return through the outer legs 19 and 20 of stationary member 12. All parts of the laminations are designed to carry the needed magnetic flux without saturation, and to be economical to make and assemble. The laminations fit conventional standards for low-cost 60 cycles/second machines. For example, the laminations may be made of 0.025-inch thick low silicon (½ to 1 percent) steel, to limit eddy currents and provide sharp edges in punching without incurring extra cost. In the design shown in FIG. 1 the E-shaped laminations have two different end leg lengths, 22, and 23, which match the adjacent L-shaped laminations 24 and 25 for contiguous assembly with lap joints 26 and 27. The laminations are held together in any suitable manner, such as by rivets 28 placed at the outer corners of the stationary member 12 and at its centerline, and by rivets 29 placed at the outer edges of the lap joints, so that no parasitic currents will be induced in them.

Figure 4:
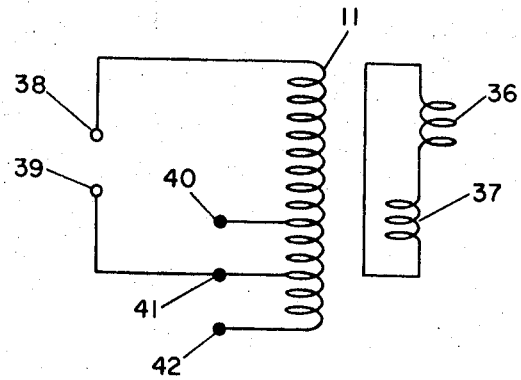
FIG. 4 is a schematic circuit of the main and balancing coils which cooperate to effect the desired linear movement.

The main coil may be rectangular and is closely wound. Taps 40, 41, and 42, respectively, shown in FIG. 4 are brought out at 95, 100, and 105 percent (more or less) of normal turns, to permit economical operation at different voltages and load conditions. Slap of the moving member at overvoltage and/or low load can be avoided by appropriate choice of taps, and possibly switching from one tap to another (not shown). Materials, wire gages, etc., are conventional. An insulating tube 30 is cemented to the center leg 18, to act as an interface between the mail coil 11 and the pole. The coils turns are suitably insulated such as with an epoxy composition. The close coil winding, cementing, and final impregnation ensure maximum heat transfer, in accordance with conventional manufacturing practice.

Figure 2:
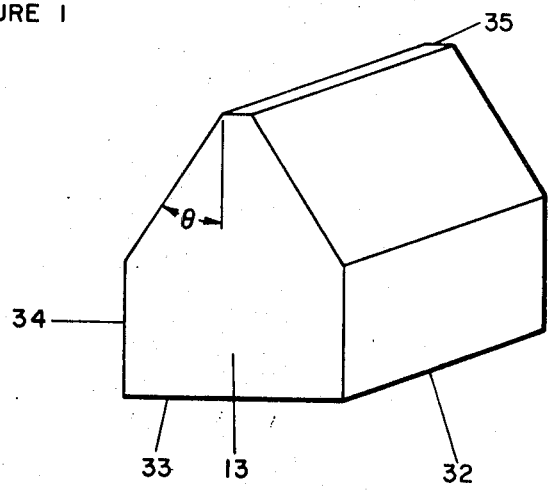
FIG. 2 is a perspective view of the taper-ended moving member of the motor of FIG. 1.

FIGS. 1 and 2 show the preferred configuration wherein the convex-tapered end of the moving member 13 fits into the concave-tapered center leg 18. These shapes, in which $\theta$ is the half-angle of taper, allow the working airgaps 14 and 15 to be much smaller than the axial stroke, since motion of member 13 through a distance D causes only a change $D \sin \theta$ in the two airgaps. The value of $\theta$ is chosen to be smaller the longer the stroke of the plunger; usually $\theta$ is between 14° and 45°, but it may be as large as 90°, giving a flat gap, if the required length of stroke is very small.

For a given total magnetic flux, and fixed width of center leg 18, the taper gives a larger airgap area, and a lower flux density across the gaps. But the force developed across the airgaps must be larger when $\theta$ is less than 90° because only the vertical component of the force is useful. Accordingly, the smaller the angle $\theta$ the greater the flux required, with a corresponding increase in the areas of the lamination yoke and legs. The net result, however, is a considerable reduction in the number of ampere turns required, and therefore a marked reduction in the size of the main coil 11, and in the volt-amperes of reactive power drawn from the line, as compared with a flat gap.

Figure 3:
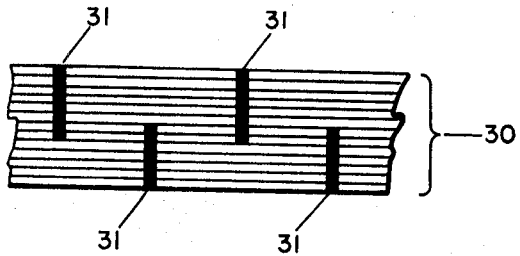
FIG. 3 is a section view illustrating a suitable fastening arrangement of the laminations of the moving member.

The laminations of moving member 13 are normally made from the same conventional material as the stationary member 12 and are preferably held together by welding, as shown schematically in FIG. 3. The staggered welds 31 are carried only part way across, to interrupt the eddy current paths. This construction is preferred to riveting, as it reduces the eddy current losses, and as the rivets may become loose under high oscillating forces.

In one particular linear motor constructed in accordance with this invention for 120 cycle/second motion on full wave AC (60 c.p.s.) with a half-inch stroke, to give ⅓ HP output, the moving member 13 had an edge length 32 of 2 inches, an edge length 33 of 1½ inches, an edge length 34 of also 1½ inches, and an edge length 35 of 0.1 inch. The half-angle of taper is $\theta = 30°$.

The airgap is given a safe clearance to avoid damaging slap of moving member 13. In this case the minimum was chosen to be 0.020 inch. At half-stroke the airgap is then $0.020 + 0.25 \sin 30° = 0.145$ inch, and at full stroke it is $0.020 + 0.50 \sin 30° = 0.270$ inch.

The parasitic airgaps 16 and 17, shown in FIG. 1, are made as small as feasible. Typical dimensions are, for example, 0.015 or 0.020 inch. A serious difficulty is inherent in this arrangement, with opposite parasitic gaps. For, if the two gaps are unequal, by the moving member being displaced to one side, the magnetic flux will increase on the short gap side, and decrease on the other side, making the side magnetic pull on the short side much greater. This will pull the moving member father over, causing it to "seize" against the face of the adjacent lower leg. Thus, with the usual prior art design, the position of the moving member is unstable, and its sidewise motion must be restrained by guide bearings, or a connecting-rod guide, unless the parasitic gaps are undesirably large. The bearings introduce costs, friction losses, and maintenance problems. Also, they limit the possible applications of the device because in cases of high ambient or the presence of some chemicals, it is not permissible to use lubricants.

Moreover, it has been found the the tapered airgap configuration, while offering important and significant advantages, is much more sensitive to the foregoing problem of sidewise motion of the moving member than is the flat airgap configuration.

In accordance with this invention of the foregoing problems are obviated to permit the use of small parasitic gaps, and tapered working airgaps without any guide bearings or lubrication. This is accomplished by providing duplicate "balancing coils" on the two lower legs, as shown at 36 and 37 in FIG. 1. These two coils are connected in series and then short-circuited, as indicated in FIG. 4. If the main flux divides equally, the flux linking each balancing coil is the same, and the voltages induced in them are equal and opposite, so no current flows in the coils. This is the normal operating condition. If the flux divides unequally, so the flux density and therefore the magnetic pull on one side is greater than on the other, the voltages in the two balancing coils are unequal, and the difference voltage causes a current in the two coils, whose MMF creates a "through" flux that adds to the low flux and substracts from the high flux, thus restoring equality of side pull on the two sides. In this way, the balancing coils hold the moving member in its central position, and allow the use of small parasitic gaps without guide bearings. Of course, the ability of the balancing coils to maintain symmetry is limited by their resistance. Good design requires good judgement in deciding how much copper to put in the balancing coils, versus the use of larger parasitic gaps. As previously stated, the balancing coils are useful with a flat gap design ($\theta=90°$), but are more needed the smaller the value of $\theta$.

The balancing coils 36 and 37 are rectangular in cross section, and are closely wound, using conventional materials, with final epoxy impregnation to ensure maximum heat transfer and prevent vibration. The number of turns in the coils is immaterial, as they are short-circuited, so this is chosen to give the lowest cost, for the desired amount of copper (or aluminum). The insulating sleeves 43 and 44 are thin, as the induced voltages are very small, but they must be mechanically sound.

Figure 5:
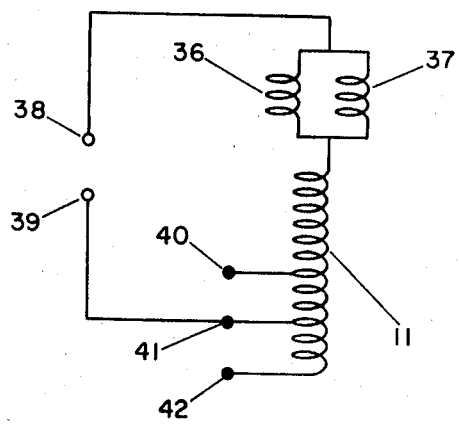
FIG. 5 is a schematic circuit diagram of an alternative circuit for the main and balancing coils.

Instead of isolating the two balancing coils as illustrated in FIG. 4, they may be connected in series with the main coil, as indicated in FIG. 5. In this case, half of the main coil current flows in each balancing coil, in directions which add to the MMF of the main coil, causing the magnetic flux to divide into equal right- and left-directed flows across the two parasitic gaps. But, any inequality of the fluxes across the parasitic gaps creates a circulating current in the balancing coil circuit that restores equality. In this way, the balancing coils will carry useful current in normal operation, and so reduce the ampere turns required in the main coil. However, this arrangement requires more insulation for the balancing coils. Also, it creates an MMF across the outsides of the bottom legs, thereby increasing the leakage flux.

As previously described, the balancing coils 36 and 37 are most effective when the taper angle $\theta$ is large. When $\theta$ is small, the moving member 13 may tend to tip making one of the working airgaps 14 or 15 smaller than the other. In such case the flux will increase in the smaller gap, causing a side magnetic pull, which further increases the inequality. Any tilting of the moving member 13 will also have an effect on the parasitic gaps 16 and 17. That is, gaps 16 and 17 will tend to become unequal also on the opposite sides.

In accordance with another feature of this invention, these undesirable effects may be corrected by providing an airgap 45, dividing the central leg and the yoke of the laminations in halves.

In the absence of airgap 45, for example, if parasitic gap 16 is smaller than gap 17 and working gap 15 is smaller than gap 14, more than half of the main pole flux will leave the moving member 13 across gap 16 and return across 15. When gap 45 is present, however, the flux in outer leg 19 must cross both gap 45 and gap 15 to return to the right-hand side of the moving member 13, for the orientation shown in FIG. 1, while it must cross only gap 14 to return to the left-hand side.

Accordingly, the effect of gap 45 is to compel a more nearly equal division of the flux between the working gaps 14 and 15, even though one may be smaller than the other.

A still further equalizing effect may be achieved by extending the center gap 45 along the central axis of moving member 13. Such extended airgap is operative to further oppose any inequality of the fluxes on the right- and left-hand sides due to tilting of moving member 13.

It is to be understood that the present invention is not limited to use with linear motor designs such as that illustrated and described therein but may be sued as well with linear motors of various designs and constructions. For example, the invention could be used to advantage with a twin-plunger configuration such as that shown in U.S. Pat. No. 3,312,842.

In such a single-coil, twin-plunger design there would be four working airgaps and no parasitic airgaps. In such an arrangement the balancing coils could be suitably disposed on the outer legs of the stationary member and connected in series and short-circuited, as illustrated in FIG. 4. The balancing coils would again function to maintain equality of fluxes of the two outer legs and prevent side pull of the two plungers, even though the airgaps may be unequal thereby assuring linear movement of the moving member.

There has been shown and described a new and improved linear electric motor which is adaptable to a wide range of applications and which enables the desired performance to be achieved with fewer ampere turns in the main coil resulting in lower cost and requiring less reactive volt-amperes.

While only certain preferred embodiments of the invention have been shown and described by way of illustration, many changes and modifications will occur to those skilled in the art. Accordingly, it is intended by the appended claims to cover all such changes and modifications as fall within the true spirit and scope of the invention.

What we claim as new and desire to secure by United States Letters Patent is:

1. A linear reciprocating electric machine comprising:
   a. a stationary member having a cross section in the form of an open rectangle with one long side comprising first and second leg portions extending toward each other but terminating short of each other so as to provide an opening, said member further including a central leg extending inwardly of said open rectangle from the other long side thereof toward said opening provided by said first and second leg portions;
   b. a moving member adapted for movement within the opening provided by said first and second leg portions and defining a working airgap between the end portion of said moving member and the extending end of said central leg and parasitic airgaps between the terminations of said first and second leg portions and the sides of said moving member;
   c. first coil means disposed on said central leg adapted when energized to establish two flux paths each of which includes a parasitic airgap and a working airgap to produce the required magnetomotive force to effect movement of the moving member;

d. and second coiled means disposed on said first and second leg portions of said stationary member to balance said moving member against transverse forces by maintaining equality of fluxes on both sides of said moving member to prevent side pull and assure linear movement.

2. The linear reciprocating electric machine recited in claim 1 wherein said second coiled means disposed on said first and second leg portions comprise a pair of identical coils connected together in series bucking relationship in a series circuit loop.

3. The linear reciprocating electric machine recited in claim 1 wherein said second coiled means disposed on said first and second leg portions comprise a pair of identical coils connected in series-bucking relationship with each other and in series circuit relationship with the coil means disposed on said central leg.

4. The linear reciprocating electric machine recited in claim 1 wherein the extending end of said central leg and the coacting end of said moving member are of generally trapezoidal cross section to establish working airgaps having a half-angle of taper less than 90°.

5. The linear reciprocating electric machine recited in claim 4 wherein said half-angle of taper is in the range of about 15° to 45°.

6. The linear reciprocating electric machine recited in claim 4 wherein said second coil means disposed on said first and second leg portions comprise a pair of identical coils connected together in series-bucking relationship in a series circuit loop.

7. The linear reciprocating electric machine recited in claim 6 wherein said half-angle of taper is in the range of about 15° to 45°.

8. The linear reciprocating electric machine recited in claim 4 wherein said second coil means disposed on said first and second leg portions comprise a pair of identical coils connected in series-bucking relationship with each other and in series circuit with relationship with the coil means disposed on said central leg.

9. The linear reciprocating electric machine recited in claim 8 wherein said half-angle of taper is in the range of about 15° to 45°.

10. The linear reciprocating electric motor recited in claim 4 wherein said stationary member further includes a high-reluctance region extending through the major portion of the length of said central leg in a direction colinear with the axis of motion of said moving member and being effective to compel a more equal division of flux across said working airgaps.

11. The linear reciprocating electric motor recited in claim 10 wherein said high-reluctance region is an airgap.

* * * * *